(12) United States Patent
Averhart et al.

(10) Patent No.: US 10,893,228 B2
(45) Date of Patent: Jan. 12, 2021

(54) SYSTEM AND METHOD FOR DISPLAYING INFORMATION IN A VEHICLE

(71) Applicant: GM GLOBAL TECHNOLOGY OPERATIONS LLC, Detroit, MI (US)

(72) Inventors: Andrew W. Averhart, Canton, MI (US); Ismail Hamieh, Windsor (CA); Guangyu J. Zou, Warren, MI (US); David A. Craig, Macomb Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/052,725

(22) Filed: Aug. 2, 2018

(65) Prior Publication Data

US 2020/0045260 A1 Feb. 6, 2020

(51) Int. Cl.
| | |
|---|---|
| *H04N 5/445* | (2011.01) |
| *G06K 9/00* | (2006.01) |
| *G06T 3/40* | (2006.01) |
| *G06T 3/60* | (2006.01) |
| *B60R 1/00* | (2006.01) |
| *G06F 16/29* | (2019.01) |
| *G06F 16/51* | (2019.01) |
| *G06F 16/58* | (2019.01) |

(52) U.S. Cl.
CPC ........... *H04N 5/44504* (2013.01); *B60R 1/00* (2013.01); *G06F 16/29* (2019.01); *G06F 16/51* (2019.01); *G06F 16/5866* (2019.01); *G06K 9/00791* (2013.01); *G06T 3/40* (2013.01); *G06T 3/608* (2013.01); *B60R 2300/20* (2013.01); *B60R 2300/302* (2013.01); *B60R 2300/308* (2013.01)

(58) Field of Classification Search
CPC .. H04N 5/232; H04N 5/23254; H04N 5/2356; H04N 5/351; H04N 5/35581; H04N 5/374; H04N 7/183; H04N 13/246; H04N 5/23229; H04N 5/74; H04N 7/18
See application file for complete search history.

(56) References Cited

U.S. PATENT DOCUMENTS

| | | | |
|---|---|---|---|
| 2015/0145995 A1* | 5/2015 | Shahraray | H04W 4/70 348/148 |
| 2015/0205622 A1* | 7/2015 | DiVincent | G06F 21/32 713/100 |
| 2016/0275793 A1* | 9/2016 | Yokochi | G06K 9/00818 |
| 2019/0279007 A1* | 9/2019 | Zinner | G06K 9/6215 |

* cited by examiner

*Primary Examiner* — Samira Monshi

(57) ABSTRACT

An automotive vehicle includes a sensor configured to detect features external to the vehicle, an HMI configured to signal an alert to an operator of the vehicle, and a controller. The controller is in communication with the sensor and the HMI, and is in communication with a non-transient computer-readable storage medium provided with a road furniture database. The road furniture database includes a plurality of items of road furniture having associated road furniture geolocations and road furniture classifications. The controller is configured to, in response to the vehicle being proximate a respective road furniture geolocation for a respective item of road furniture and the sensor not detecting the respective item of road furniture, control the HMI to signal an alert.

10 Claims, 4 Drawing Sheets

SYSTEM AND METHOD FOR DISPLAYING INFORMATION IN A VEHICLE

TECHNICAL FIELD

The present disclosure relates to vehicles having sensors configured to sense regions external to and proximate the vehicle, and particularly to vehicles having augmented reality camera systems.

INTRODUCTION

Automotive vehicles generally operate on roadways provided with a variety of road furniture. Road furniture refers to roadside objects used for traffic control and driver assistance. Road furniture includes, but is not limited to, stop signs, stop lights, yield signs, directional signs, regulatory signs, and road paint. It is therefore highly desirable to ensure that operators of automotive vehicles are aware of the road furniture proximate their vehicle at all times.

SUMMARY

An automotive vehicle according to the present disclosure includes a sensor configured to detect features external to the vehicle, an HMI configured to signal an alert to an operator of the vehicle, and a controller. The controller is in communication with the sensor and the HMI, and is in communication with a non-transient computer-readable storage medium provided with a road furniture database. The road furniture database includes a plurality of items of road furniture having associated road furniture geolocations and road furniture classifications. The controller is configured to, in response to the vehicle being proximate a respective road furniture geolocation for a respective item of road furniture and the sensor not detecting the respective item of road furniture, control the HMI to signal an alert.

In an exemplary embodiment, the HMI includes an augmented reality interface, and the controller is configured to control the augmented reality interface to signal an alert by displaying an augmented reality overlay including indicia associated with the respective item of road furniture. The indicia may include an image associated with a respective road furniture classification of the respective item of road furniture. The image may be scaled based on a distance between a current vehicle location and the respective geolocation of the respective item of road furniture. The road furniture database may further include road furniture orientations associated with the plurality of items of road furniture, and the image may be skewed based on a respective road furniture orientation of the respective item of road furniture relative to a current heading of the vehicle.

In an exemplary embodiment, the road furniture database is provided in a high definition map database.

In an exemplary embodiment, the sensor comprises an optical camera.

A method of controlling a vehicle according to the present disclosure includes providing a host vehicle with a sensor configured to detect features external to the vehicle, an HMI configured to signal an alert to an operator of the vehicle, and a controller in communication with the sensor and the HMI. The method additionally includes detecting, via the controller, a current geolocation of the host vehicle. The method also includes accessing, via the controller, a road furniture database comprising a plurality of items of road furniture having associated road furniture geolocations and road furniture classifications. The method further includes identifying, via the controller, a respective item of road furniture having a respective road furniture geolocation proximate the current geolocation of the host vehicle. The method further includes determining, via the controller, whether the sensor indicates the presence of the respective item of road furniture at the respective road furniture geolocation. The method further includes, in response to the sensor not indicating the presence of the respective item of road furniture, automatically controlling the HMI, via the controller, to signal an alert.

In an exemplary embodiment, the HMI comprises an augmented reality interface. In such an embodiment, controlling the HMI to signal an alert comprises controlling the augmented reality interface to display an augmented reality overlay including indicia associated with the respective item of road furniture. Such embodiments may include identifying, via the controller, a respective road furniture classification associated with the respective item of road furniture, with the indicia including an image associated with the respective road furniture classification. Such images may be scaled based on a distance between a current vehicle location and the respective geolocation of the respective item of road furniture, and/or skewed based on a respective road furniture orientation of the respective item of road furniture relative to a current heading of the vehicle.

In an exemplary embodiment, the sensor comprises an optical camera.

A system for displaying images according to the present disclosure includes an optical camera, an augmented reality display, and a controller in communication with the optical camera and the augmented reality display. The controller is configured to communicate with a non-transient computer-readable storage medium provided with a physical object database. The physical object database includes a plurality of physical objects having associated object geolocations and object classifications. The controller is configured to, in response to the optical camera being in line-of-sight of a respective object geolocation for a respective physical object and the optical camera not detecting the respective physical object, control the augmented reality display to display a composite image comprising images captured by the optical camera and indicia associated with the respective object classification of the respective physical object.

In an exemplary embodiment, the system additionally includes an automotive vehicle having an occupant cabin, with the augmented reality display defining an HMI disposed in the occupant cabin.

In an exemplary embodiment, the indicia comprise an image associated with the respective object classification. The image may be scaled based on a distance between a current location of the augmented reality display and the respective object geolocation and/or skewed based on a respective object orientation of the respective physical object.

Embodiments according to the present disclosure provide a number of advantages. For example, the present disclosure provides a system and method for notifying an operator of a vehicle when items of road furniture may be obstructed or otherwise not clearly visible, and moreover does so in an intuitive fashion.

The above and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
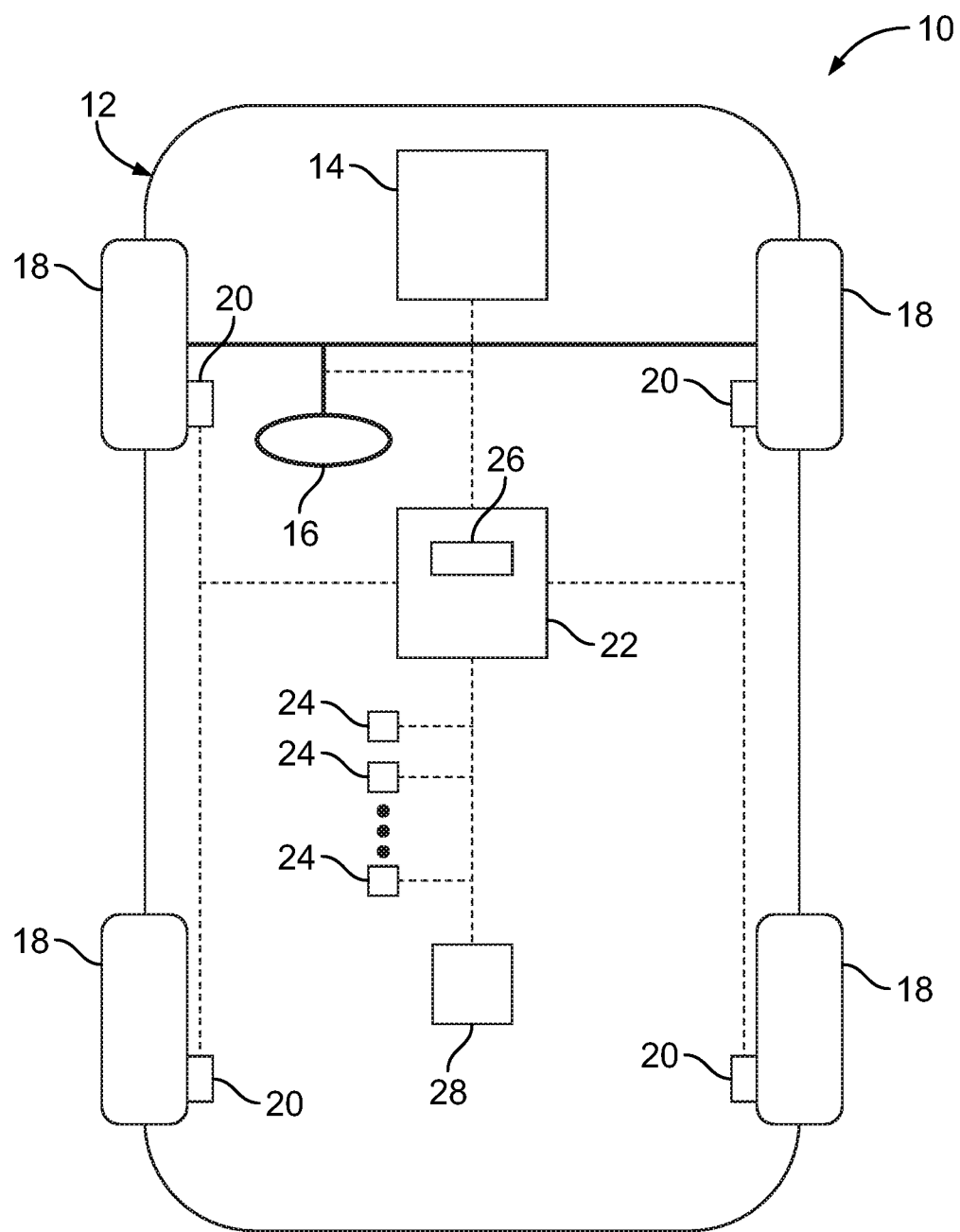
FIG. 1 is a schematic diagram of a vehicle according to an embodiment of the present disclosure.

Referring now to FIG. 1, a system 10 for controlling a vehicle according to the present disclosure is shown in schematic form. The system 10 includes an automotive vehicle 12. The automotive vehicle 12 includes a propulsion system 14, which may in various embodiments include an internal combustion engine, an electric machine such as a traction motor, and/or a fuel cell propulsion system. The automotive vehicle 12 additionally includes a steering system 16. While depicted as including a steering wheel for illustrative purposes, in some embodiments within the scope of the present disclosure, the steering system 16 may omit the steering wheel. The automotive vehicle 12 additionally includes a plurality of vehicle wheels 18 and associated wheel brakes 20 configured to provide braking torque to the vehicle wheels 18. The wheel brakes 20 may, in various embodiments, include friction brakes, a regenerative braking system such as an electric machine, and/or other appropriate braking systems.

The propulsion system 14, steering system 16, and wheel brakes 20 are in communication with or under the control of at least one controller 22. While depicted as a single unit for illustrative purposes, the controller 22 may additionally include one or more other controllers, collectively referred to as a "controller." The controller 22 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle.

The controller 22 is in communication with a plurality of sensors 24. In an exemplary embodiment the sensors 24 include one or sensors configured to capture information about traffic lanes in the vicinity of the vehicle 12 such as RADAR, LiDAR, optical cameras, thermal cameras, and ultrasonic sensors. In addition, the sensors 24 include one or more sensors configured to detect velocity, acceleration, and yaw rate of the vehicle 12. Such sensors may include one or more inertial measurement units. Furthermore, the sensors 24 include one or more sensors configured to detect a current geolocation of the vehicle, such as a GPS system. The sensors 24 may also include additional sensors or any combination of the above as appropriate.

The controller 22 is in communication with non-transient data storage 26. The non-transient data storage 26 is provided with data, e.g. in the form of one or more databases, including a road furniture database having a list of known road furniture and associated intersection positions. Road furniture refers to roadside objects used for traffic control and driver assistance. Road furniture includes, but is not limited to, stop signs, stop lights, yield signs, directional signs, regulatory signs, and road paint. The road furniture database may be generated using any known method for generating high-definition maps of roadways and the appurtenances thereof. The data storage 26 may be local storage physically located in the vehicle, remote storage physically located external to the vehicle and accessed via a wireless communication system such as cellular communications or other wireless interface, or a combination thereof.

The controller 22 is additionally in communication with a human-machine interface (HMI) 28. According to various embodiments, the HMI 28 may include a heads-up display (HUD), multi-function video display (MFD), audio notification system, haptic notification system, or any other suitable means of communicating information to an occupant of the vehicle 12.

Figure 2:
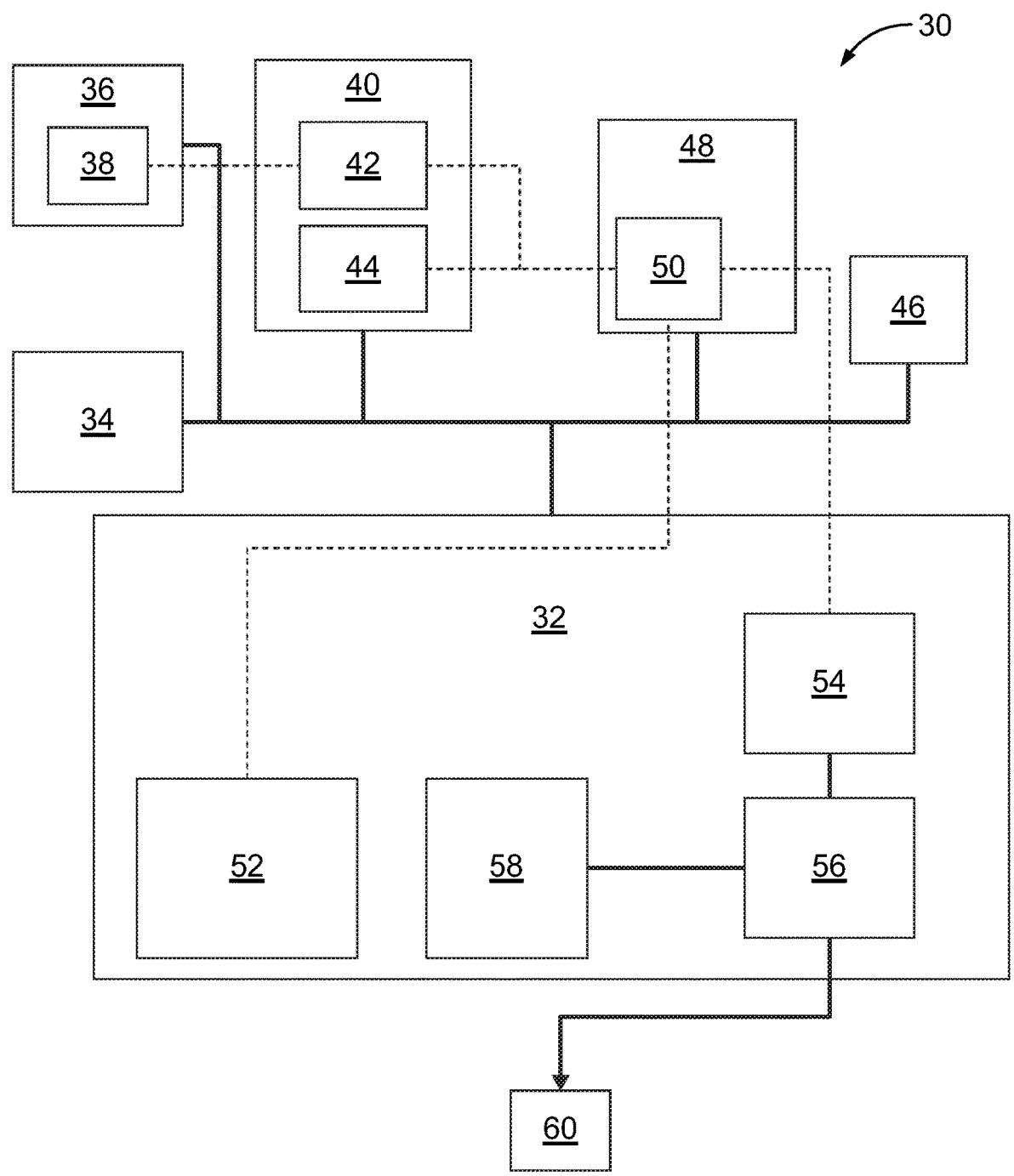
FIG. 2 is a block diagram representation of a control system for a vehicle according to an embodiment of the present disclosure.

Referring now to FIG. 2, a system 30 for presenting information to an occupant of the vehicle 12 is illustrated. The system 30 may be implemented in one or more components of the vehicle 12, as will be discussed in further detail below.

The system 30 includes a central processing module 32. The central processing module 32 may be implemented, for example, via the controller 22. The central processing module 32 may alternatively be referred to as a center stack module.

The central processing module 32 is in communication with a telematics module 34. The telematics module 34 is configured to monitor operating parameters of the vehicle 12 and communicate with systems external to the vehicle 12, e.g. via vehicle-to-vehicle (V2V) or vehicle-to-infrastructure (V2I) communication such as a cellular communication system, 802.11 ("WiFi™") communication system, DSRC communication system, or others. The telematics module 34 may be implemented via the controller 22 in conjunction with one or more wireless communications systems.

The central processing module 32 is additionally in communication with a localization module 36. The localization module 36 is configured to estimate a location and orientation of the vehicle 12 relative to the vehicle's surrounding environment. The localization module 36 is provided with a high-definition (HD) map database 38. The HD map database 38 includes information pertaining to road and traffic control features at a plurality of geolocations. The HD map database 38 includes the road furniture database. The HD map database 38 may be locally stored, e.g. in the data storage 26, stored remotely and accessed via a wireless communication system such as the telematics module 34, or a combination thereof.

The central processing module 32 is additionally in communication with a sensor module 40. The sensor module 40 may be implemented via the controller 22 to control one of the sensors 24, e.g. a front-facing camera. The sensor module 40 includes a sensor localization algorithm 42. The sensor localization algorithm 42 is configured to map features detected by the sensor to features in the HD map database 38. The sensor module 40 additionally includes a road furniture recognition algorithm 44. The road furniture recognition algorithm 44 is configured to process signals received by the sensor, e.g. images captured by a camera, to identify one or more items of road furniture present in the vicinity of the vehicle 12.

The central processing module 32 is additionally in communication with an augmented reality (AR) camera module 46. The AR camera module 46 may be implemented via the controller 22 to control one of the sensors 24, e.g. a dedicated AR camera. The AR camera module 46 is configured to provide a real-time video feed for processing and display in an in-cabin AR system. While depicted as a separate module from the sensor module 40, in alternative embodiments the sensor module 40 and AR camera module 46 may be integrated into a single module.

The central processing module 32 is additionally in communication with an external object calculation module 48. The external object calculation module 48 may be implemented via the controller 22. The external object calculation module 48 is configured to calculate positions and velocities of objects external to the vehicle 12 relative to the vehicle 12. The external object calculation module 48 includes a map fusion algorithm 50. The map fusion algorithm 50 is configured to receive features mapped by the sensor localization algorithm 42, items of road furniture recognized by the road furniture recognition algorithm 44, and a road furniture memory database 52 associated with the central processing module 32. While depicted as a separate database from the HD map database 38, in alternative embodiments the road furniture memory database 52 may be provided as a component of the HD map database 38. The road furniture memory database 52 comprises a plurality of known road furniture data, including geolocation of known road furniture, classification of the known road furniture, e.g. type of road sign, and orientation of the road furniture relative to traffic lanes. The map fusion algorithm 50 is configured to output a comparison of detected and identified items of road furniture against expected items of road furniture at the current geolocation and orientation of the host vehicle.

The central processing module 32 is provided with a missing/obstructed road furniture detection algorithm 54. The missing/obstructed road furniture detection algorithm 54 is configured to, in response to the map fusion algorithm 50 indicating that an item of road furniture is expected at the current location and orientation when no such road furniture is detected, signal a missing/obstructed road furniture flag. The missing/obstructed road furniture flag indicates that an expected item of road furniture is not detected. The missing/obstructed road furniture detection algorithm 54 may also include a classification, geolocation, and orientation of the expected item of road furniture.

The central processing module 32 additionally includes an AR display algorithm 56. The AR display algorithm 56 is in communication with the missing/obstructed road furniture detection algorithm 54, a road furniture image database 58, and with one or more augmented reality displays 60. In response to the missing/obstructed road furniture detection algorithm 54 signaling a missing/obstructed road furniture flag, the AR display algorithm 56 generates an appropriate image overlay for display on the augmented reality display 60. The AR display algorithm may, for example, select an image from the road furniture image database 58 based on a classification of the missing/obstructed road furniture, scale the image based on a relative location between the host vehicle and the geolocation of the missing/obstructed road furniture, skew the image based on the orientation of the expected item of road furniture relative to the host vehicle, and overlay the resulting image on images captured by the AR camera 46 for display on the augmented reality display 60.

Variations of the above are, of course, possible. As an example, other embodiments may utilize other HMIs, such as audio cues, haptic cues, or by projecting AR images via a HUD. As an additional example, other embodiments may omit one or more of the modules illustrated in FIG. 2, such as the external object classification module and/or the localization module.

Figure 3:
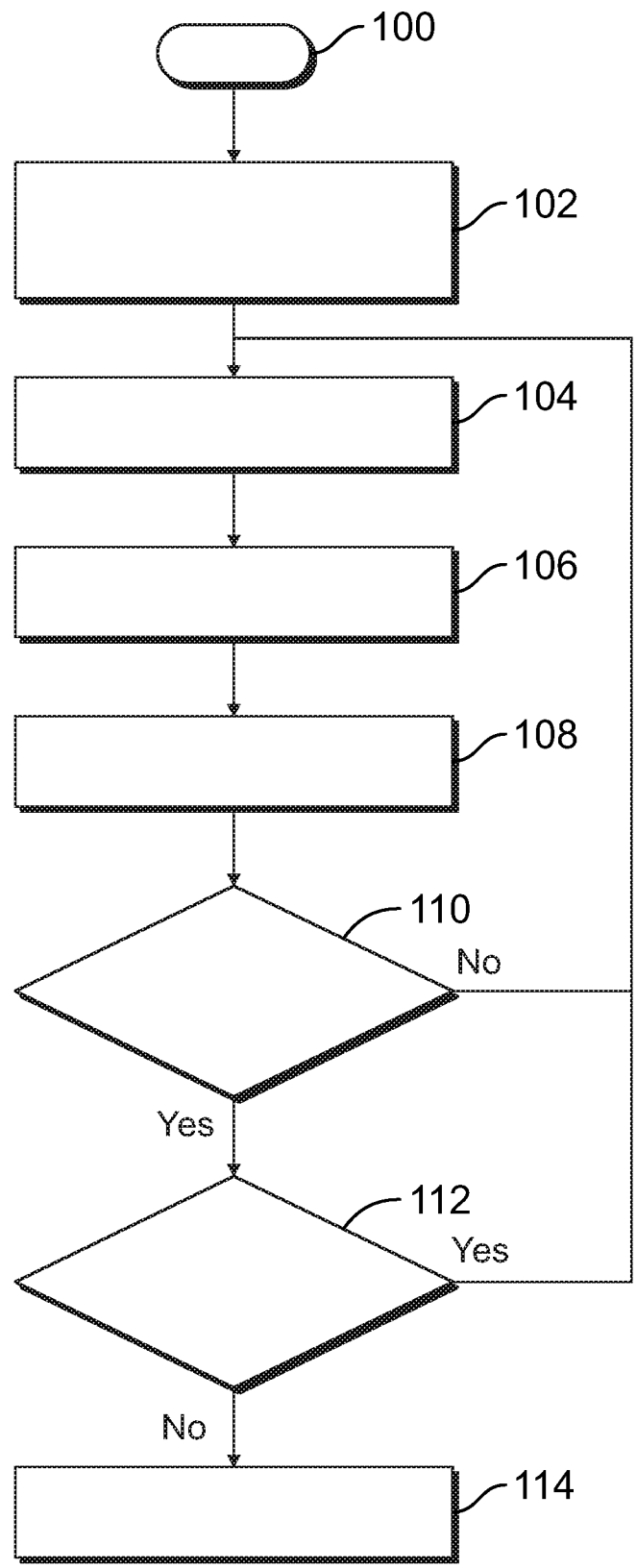
FIG. 3 is a flowchart representation of a method for controlling a vehicle according to an embodiment of the present disclosure.

Referring now to FIG. 3, a method of controlling a vehicle according to the present disclosure is illustrated in flowchart form. The method begins at block 100.

A host vehicle is provided with at least one sensor, an HMI, and at least one controller, as illustrated at block 102. In an exemplary embodiment, the host vehicle is configured generally as illustrated in FIG. 1.

Sensor readings are obtained, via the sensors(s), for an area proximate the host vehicle, as illustrated at block 104. In an exemplary embodiment, the sensing comprises capturing one or more images via an optical camera. However, in other embodiments, other sensor types may be used.

Features in the sensor data are identified, as illustrated at block 106. This may be performed via any known image processing means for identifying and classifying physical features based on sensor data.

A road furniture database is accessed, as illustrated at block 108. The road furniture database comprises road furniture geolocations and classifications, as discussed above. In an exemplary embodiment, the road furniture database is a portion of an HD map of a geographic area.

A determination is made of whether one or more items of road furniture are anticipated proximate the host vehicle, as illustrated at operation 110. In an exemplary embodiment, this comprises comparing a current geolocation of the host vehicle to data in the road furniture database. The current geolocation of the host vehicle may be determined automatically by a controller in communication with a sensor configured to detect a geolocation of the vehicle, e.g. a GPS system. An item of road furniture may be considered proximate if it is within sensor range of the host vehicle, e.g. in line-of-sight.

If the determination of operation 110 is negative, i.e. no road furniture is anticipated proximate the host vehicle, then control returns to block 104. The algorithm thereby does not proceed unless and until road furniture is anticipated proximate the host vehicle.

If the determination of operation 110 is positive, then a determination is made of whether items of road furniture are detected which correspond to the anticipated road furniture, as illustrated at operation 112. In an exemplary embodiment, this comprises determining whether the features identified in block 106 indicate an item of road furniture of the type and in the location anticipated based on the road furniture database.

If the determination of operation 112 is positive, i.e. the corresponding road furniture is detected, then control returns to block 104. The algorithm thereby does not proceed unless and until road furniture is anticipated proximate the host vehicle.

If the determination of operation 112 is negative, then a notification is signaled to a vehicle operator via the HMI, as illustrated at block 114. In an exemplary embodiment, this comprises overlaying an image of the expected road furniture over the present environment via an AR display, e.g. as discussed above with respect to FIG. 2 and below with respect to FIG. 4. However, in other embodiments, other notifications may be provided. As non-limiting examples, the notification may comprise an auditory notification such as a verbal notification, a haptic notification, a notification via a HUD, other suitable notification, or any combination thereof.

Figure 4:
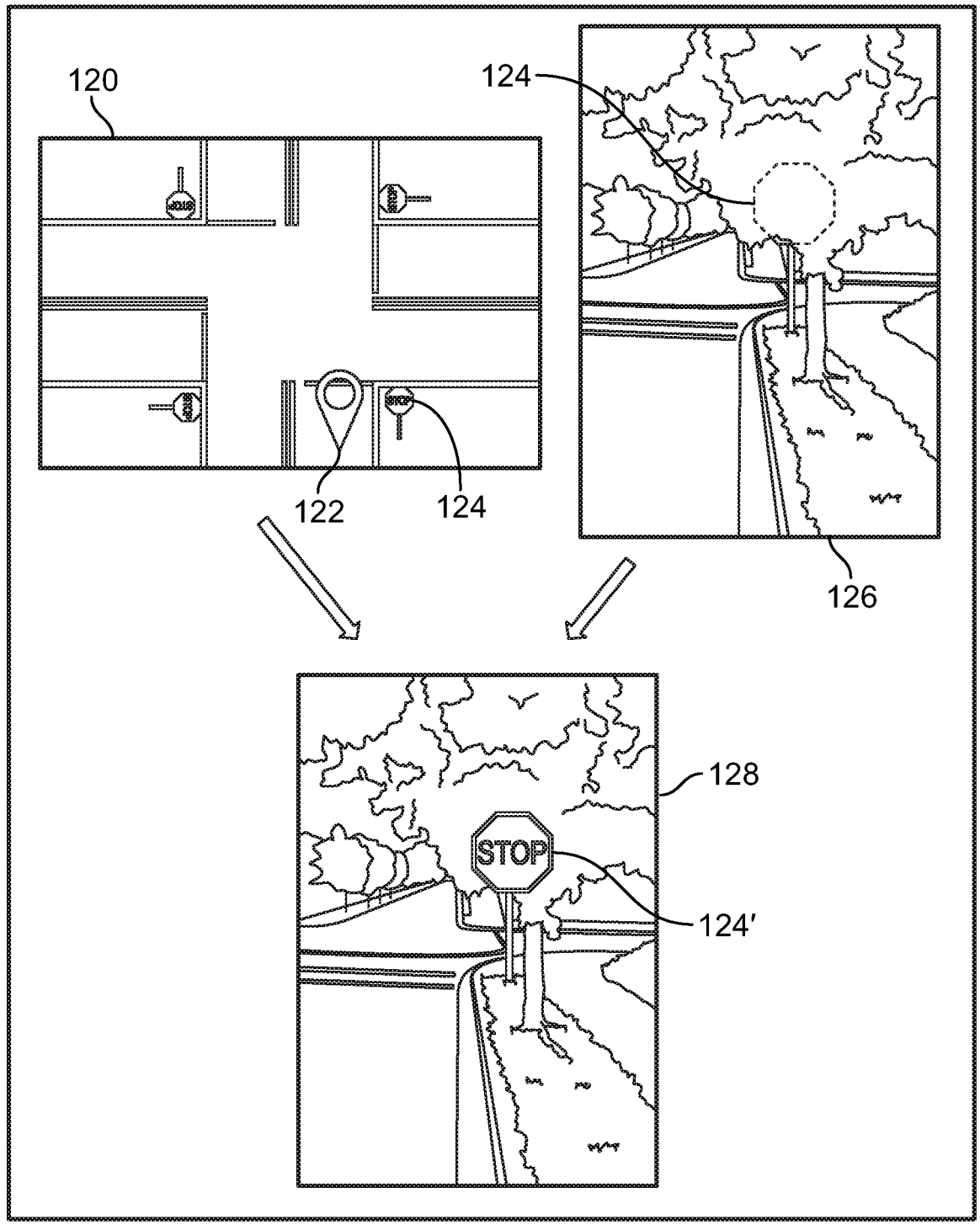
FIG. 4 is an illustration of a method of providing a notification according to an embodiment of the present disclosure.

Referring now to FIG. 4, operation of a system according to the present disclosure is illustrated. An HD map 120 is accessed to determine features proximate a current host vehicle geolocation 122. In the illustrated configuration, the HD map 120 indicates the presence of an item of road furniture 124 proximate the current vehicle location 122. For illustrative purposes the item of road furniture 124 is shown as a stop sign; however, the item of road furniture may be other items as discussed above.

Sensor data 126 of an area proximate the host vehicle is captured. For illustrative purposes the sensor data 126 is depicted as an image captured by an optical camera; however, other sensor types may be used as discussed above. In the illustrated configuration, the item of road furniture 124 (shown in phantom) is not visible. Here it is depicted as having been obstructed by foliage; however, the system may similarly function when items of road furniture are otherwise not visible, e.g. due to weather conditions, lighting conditions, or damage to the road furniture.

In response to the expected road furniture not being detected, e.g. as discussed above with respect to FIG. 3, the system generates a notification 128 via an HMI. In the illustrated embodiment the HMI includes an AR overlay of a piece of road furniture 124'. In such an embodiment, an appropriate image for the piece of road furniture 124 is selected, e.g. from a road furniture image database as discussed above with respect to FIG. 2, and the image is scaled and skewed based on a distance and orientation of the host vehicle relative to the expected position of the item of road furniture 124. The scaled and skewed image is then inserted in an appropriate location in the sensor data 126 as the AR overlay of the piece of road furniture 124'. In other embodiments utilizing other types of HMIs, the notification 128 may take other forms as discussed above.

While the above has been described in conjunction with an automotive vehicle, it should be understood that aspects of the present invention may be embodied in non-automotive contexts as well. In such non-automotive embodiments, a database comprising a plurality of physical objects, geolocations of the physical objects, and classifications of the physical objects may be provided. A controller and HMI may access the database and present notifications in response to a physical object proximate the user being anticipated but not detected, in a generally similar fashion as discussed above.

As may be seen the present disclosure provides a system and method for notifying an operator of a vehicle when items of road furniture may be obstructed or otherwise not clearly visible, and moreover does so in an intuitive fashion.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An automotive vehicle comprising:
   a sensor configured to detect features external to the vehicle;
   a human-machine interface ("HMI") configured to signal an alert to an operator of the vehicle, wherein the HMI comprises an augmented reality interface; and
   a controller in communication with the sensor and the HMI, the controller being in communication with a non-transient computer-readable storage medium provided with a road furniture database, the road furniture database comprising a plurality of items of road furniture having associated road furniture geolocations and road furniture classifications, the controller being configured to, in response to the vehicle being proximate a respective road furniture geolocation for a respective item of road furniture and the sensor not detecting the respective item of road furniture, control the HMI to signal an alert, wherein the controller is configured to control the augmented reality interface to signal the alert by displaying an augmented reality overlay including indicia associated with the respective item of road furniture, the indicia comprising an image associated with a respective road furniture classification of the respective item of road furniture, wherein the image is scaled based on a distance between a current vehicle location and the respective geolocation of the respective item of road furniture, wherein the controller is further configured to, in response to the vehicle being proximate the respective road furniture geolocation for the respective item of road furniture and the sensor detecting the respective item of road furniture, control the HMI to not signal the alert.

2. The automotive vehicle of claim 1, wherein the road furniture database further includes road furniture orientations associated with the plurality of items of road furniture, and wherein the image is skewed based on a respective road furniture orientation of the respective item of road furniture relative to a current heading of the vehicle.

3. The automotive vehicle of claim 1, wherein the road furniture database is provided in a high definition map database.

4. The automotive vehicle of claim 1, wherein the sensor comprises an optical camera.

5. A method of controlling a vehicle, comprising:
providing a host vehicle with a sensor configured to detect features external to the vehicle, a human-machine interface ("HMI") configured to signal an alert to an operator of the vehicle, and a controller in communication with the sensor and the HMI, wherein the HMI comprises an augmented reality interface;
detecting, via the controller, a current geolocation of the host vehicle;
accessing, via the controller, a road furniture database comprising a plurality of items of road furniture having associated road furniture geolocations and road furniture classifications, wherein the road furniture database further includes road furniture orientations associated with the plurality of items of road furniture;
identifying, via the controller, a respective item of road furniture having a respective road furniture geolocation proximate the current geolocation of the host vehicle;
identifying, via the controller, a respective road furniture classification associated with the respective item of road furniture,
determining, via the controller, whether the sensor indicates the presence of the respective item of road furniture at the respective road furniture geolocation;
in response to the sensor not indicating the presence of the respective item of road furniture, automatically controlling the HMI, via the controller, to signal an alert, wherein controlling the HMI to signal an alert comprises controlling the augmented reality interface to display an augmented reality overlay including indicia associated with the respective item of road furniture, wherein the indicia comprise an image associated with the respective road furniture classification, the image being skewed based on a respective road furniture orientation of the respective item of road furniture relative to a current heading of the vehicle; and
in response to the sensor indicating the presence of the respective item of road furniture, automatically controlling the HMI, via the controller, to not signal the alert.

6. The method of claim 5, wherein the image is scaled based on a distance between a current vehicle location and the respective geolocation of the respective item of road furniture.

7. The method of claim 5, wherein the sensor comprises an optical camera.

8. A system for displaying images, comprising:
an optical camera;
an augmented reality display; and
a controller in communication with the optical camera and the augmented reality display, the controller being configured to communicate with a non-transient computer-readable storage medium provided with a physical object database, the physical object database comprising a plurality of physical objects having associated object geolocations and object classifications, the controller being configured to, in response to the optical camera being in line-of-sight of a respective object geolocation for a respective physical object and the optical camera not detecting the respective physical object, control the augmented reality display to display a composite image comprising images captured by the optical camera and indicia associated with a respective object classification of the respective physical object, wherein the indicia comprise an image associated with the respective object classification, the image being scaled based on a distance between a current location of the augmented reality display and the respective object geolocation, the controller being further configured to, in response to the optical camera being in line-of-sight of the respective geolocation for a respective physical object and the optical camera detecting the respective physical object, control the augmented reality display to not display the composite image.

9. The system of claim 8, further comprising an automotive vehicle having an occupant cabin, wherein the augmented reality display defines a human-machine interface ("HMI") disposed in the occupant cabin.

10. The system of claim 8, wherein the object database further includes object orientations associated with the plurality of physical objects, and wherein the image is skewed based on a respective object orientation of the respective physical object.

* * * * *